F. R. ALLEN.
FRICTION COIL CLUTCH.
APPLICATION FILED APR. 27, 1910.
989,102.
Patented Apr. 11, 1911.
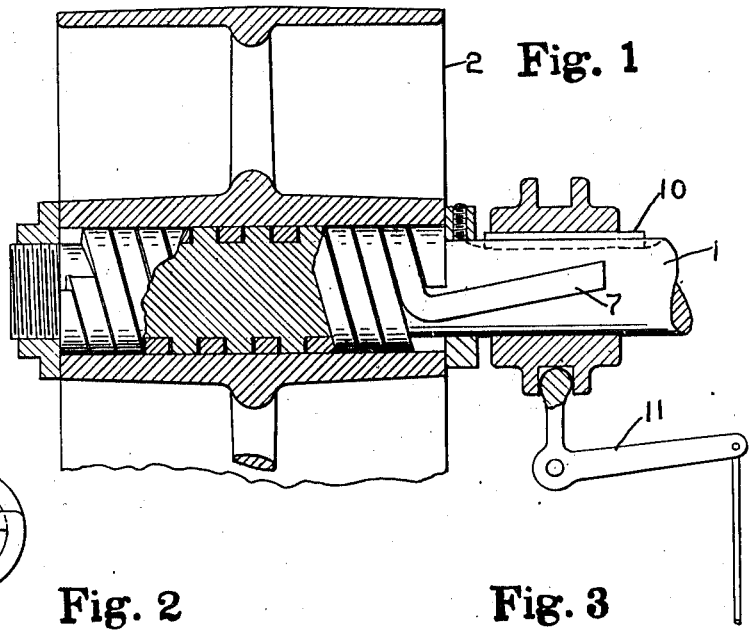
Fig. 1
Fig. 4
Fig. 2
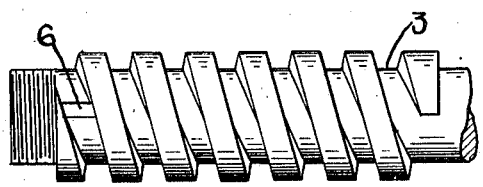
Fig. 3
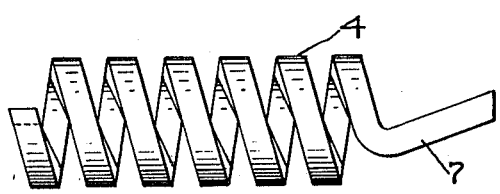
Fig. 5  Fig. 6
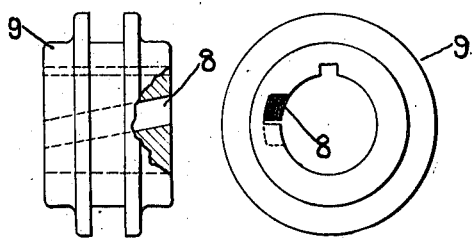
WITNESSES
Herbert L Kelley
E. J. Ogden
INVENTOR
Fred R. Allen
BY
Howard E Barlow
ATTORNEY

UNITED STATES PATENT OFFICE.

FRED R. ALLEN, OF PROVIDENCE, RHODE ISLAND, ASSIGNOR, BY MESNE ASSIGNMENTS, TO NATIONAL ANTISLIP CLUTCH COMPANY, OF BOSTON, MASSACHUSETTS, A CORPORATION OF MAINE.

FRICTION-COIL CLUTCH.

989,102.      Specification of Letters Patent.      Patented Apr. 11, 1911.

Application filed April 27, 1910. Serial No. 557,946.

*To all whom it may concern:*

Be it known that I, FRED R. ALLEN, a citizen of the United States, residing at Providence, in the county of Providence and State of Rhode Island, have invented certain new and useful Improvements in Friction-Coil Clutches, of which the following is a specification, reference being had therein to the accompanying drawing.

My invention relates to friction clutches and has for its object to provide a helically formed friction coil adapted to be expanded to engage the interior surface of a shell or hub.

A further object is to insert or thread the coil into a correspondingly grooved member whereby the coil is reinforced and effectually protected against injury.

A further object is to provide simple and effective means whereby the coil may be engaged at both ends at once for the purpose of quickly withdrawing it from engagement with the driving or driven hub.

With these and other objects in view, the invention consists of certain novel features of construction, as will be more fully described and particularly pointed out in the appended claims.

In the accompanying drawings. Figure 1— is a side elevation illustrating my improved clutch as applied to a pulley. Fig. 2— illustrates the end of a shaft which is threaded or grooved for the reception of the coil. Fig. 3— is a detail of the coil adapted to be inserted into the grooved member illustrated in Fig. 2. Fig. 4— is an end view of the coil showing one end turned inward to engage a corresponding slot in the grooved member for securing this end against relative rotation thereon. Fig. 5— is a side elevation partly in section of the sliding collar, the movement of which controls the clutch coil. Fig. 6— is an end elevation of said collar.

Referring to the drawings, 1 designates a shaft which may be either driven through the pulley 2, or serve as a driver through which said pulley may be driven. The end of this shaft is shown in Figs. 1 and 2 as being helically grooved as at 3 for the purpose of receiving a correspondingly formed coil or member 4, and for supporting and protecting the same while in action, one end of the coil being turned inward as at 5, see Fig. 4, for the purpose of engaging a corresponding slot 6, see Fig. 2, in said shaft by which this end is secured. The opposite end of the coil is provided with an extending end 7, said end being set on an angle and arranged to fit in a corresponding slot 8 in the collar 9. This collar is keyed at 10 to slide endwise on said shaft 1 through the action of the knee lever 11, or by any other convenient means. I have described the coil as engaging a corresponding groove formed in the end of the shaft 1, but this groove may be formed in a separate and independent shell attached to the shaft. In Fig. 1 I have shown a collar as operating one end of the coil but the opposite end of the coil may have a similar extending end and be operated by a similar collar whereby two ends may be wound up in opposite directions simultaneously to cause a quicker action to the clutch. As will be readily understood by those skilled in the art, the helical groove formed in the supporting member performs the function of preventing changes occurring in the diameter of the coil due to any direct pull or movement of either end of the coil in the direction of the axis of the coil.

In the operation of my improved clutch the coil may be formed in any suitable way and of any desired material. The outside diameter of the coil is normally a little greater than that of the grooved or threaded member and its inside diameter is of a size so as not to normally bottom in the groove of said member. The coil is then inserted into the groove 3 in said member and drawn tightly around the same. The outer surface is then turned or ground off providing a good bearing on which the shell or hub may run when free. As soon as the coil is released it automatically expands and grips the interior of the hub firmly locking the same securely to the shaft by the friction of a greatly extended area due to the engaging surface of the numerous coils.

By the provision of a slotted sleeve engaging the end of the coil I am enabled to perfectly control at all times the action of the clutch and to cause the same to take hold as slowly and easily as desired, which feature is of great importance in some classes of work. Another feature of my construction is that should the coil break it would still automatically open and act as a clutch to drive the parts. Another feature of my improved clutch is that by this arrangement the coil is housed within the hub of the driving or driven member thereby taking up little or no room.

Having thus described my invention, what I claim is:

1. A clutch comprising a shaft, a friction coil thereon, an inclosing power transmitting member for said coil, manually controllable means whereby said coil may be caused to expand to frictionally engage said member, and connections between the shaft and coil whereby the inclosing member, the coil, and the shaft rotate together when the coil is in expanded condition.

2. A clutch comprising a shaft, a friction coil thereon, an inclosing power transmitting member for said coil, an endwise slidable member adapted to engage the end of said coil whereby said coil may be caused to expand and contract to engage and release said member, and connections between the shaft and coil whereby the inclosing member, the coil, and the shaft rotate together when the coil is in expanded condition.

3. A clutch comprising a shaft, a friction expandible coil on the shaft and having a projecting end, an inclosing power transmitting member for said coil, an endwise slidable collar provided with a slot set at an angle to its axis for receiving the end of said coil whereby the movement of said collar causes the coil to expand and contract to engage and release said member, and connections between the shaft and coil whereby the inclosing member, the coil, and the shaft rotate together when the coil is in expanded condition.

4. A clutch comprising a member provided with a helical groove, a friction coil in said groove and connected to rotate with said member, a power transmitting member inclosing said coil, and means whereby said coil may be caused to expand to frictionally engage said transmitting member.

5. A clutch comprising a supporting member provided with a helical groove, a friction coil in said groove and connected to rotate with said member, a power transmitting member inclosing said coil, and means for drawing said coil down into said groove around said supporting member to release said transmitting member.

6. A clutch comprising a supporting member provided with a helical groove, a friction coil in said groove and connected to rotate with said member, a power transmitting member inclosing said coil, and an endwise slidable member adapted to engage the end of said coil whereby said coil may be caused to expand and contract to engage and release said transmitting member.

7. A clutch comprising a supporting member provided with a helical groove, a friction expandible coil connected at one end to said member and having a projecting end, a power transmitting member inclosing said coil, and an endwise slidable collar provided with a slot set at an angle to its axis for receiving the end of said coil whereby the movement of said collar is adapted to cause the coil to expand and contract to engage and release said transmitting member.

In testimony whereof I affix my signature in presence of two witnesses.

FRED R. ALLEN.

Witnesses:
HOWARD E. BARLOW,
E. I. OGDEN.